United States Patent [19]

Ozdemir et al.

[11] Patent Number: 4,766,516
[45] Date of Patent: Aug. 23, 1988

[54] METHOD AND APPARATUS FOR SECURING INTEGRATED CIRCUITS FROM UNAUTHORIZED COPYING AND USE

[75] Inventors: Faik S. Ozdemir, Thousand Oaks; Robert L. Seliger, Agoura; Gerald B. Rosenberg, San Mateo, all of Calif.

[73] Assignee: Hughes Aircraft Company, Los Angeles, Calif.

[21] Appl. No.: 101,529

[22] Filed: Sep. 24, 1987

[51] Int. Cl.$^4$ .................. H02B 1/00; H01L 19/00; H01L 21/00
[52] U.S. Cl. .................. 361/380; 29/569.1; 357/40
[58] Field of Search ............... 380/4, 25, 29; 361/437, 361/380; 357/85, 40; 29/59.1, 569.1

[56] References Cited

U.S. PATENT DOCUMENTS

| 3,430,564 | 3/1969 | Silvia et al. ............ 357/85 X |
| 3,564,358 | 2/1971 | Hähnlein .............. 357/40 X |
| 3,721,838 | 3/1973 | Brickman et al. ........ 357/40 X |

FOREIGN PATENT DOCUMENTS 45270 3/1982 Japan .................... 357/40

Primary Examiner—Donald A. Griffin
Attorney, Agent, or Firm—Wanda K. Denson-Low; V. G. Laslo; A. W. Karambelas

[57] ABSTRACT

A security system and method for IC circuits has at least one additional circuit element that does not contribute toward the IC's circuit function, but inhibits proper functioning of the IC in case of an attempted copying or other unauthorized use. The identity of the additional circuit elements is disguised by forming them with the visible appearance of an apparent element but with a physical modification which is not readily visible but causes them to function in a different manner, by providing different ICs with unique control codes, or both. Physical modifications not readily visible to a copyist include very narrow open circuit cuts in metallized connection lines, preferably with a focused ion beam (FIB) or laser beam; and/or disordering the lattice structure or changing the doping level of a semiconductor region, preferably with a FIB; and/or injecting electrical charge into a semiconductor region, preferably with an electron beam. The additional elements can be formed into a control code subcircuit for the IC, with the code disguised by the use of apparent elements. ICs can be grouped into an operational ring in which control codes are transmitted serially through the ring, and the invention can be applied to a combined hardware/software system. Individual copies of the software, preferably the operating system software, contain the unique control codes required by the modified ICs and the algorithms to interact with the system hardware for the purposes of transmitting, receiving, and authenticating the control codes.

65 Claims, 8 Drawing Sheets

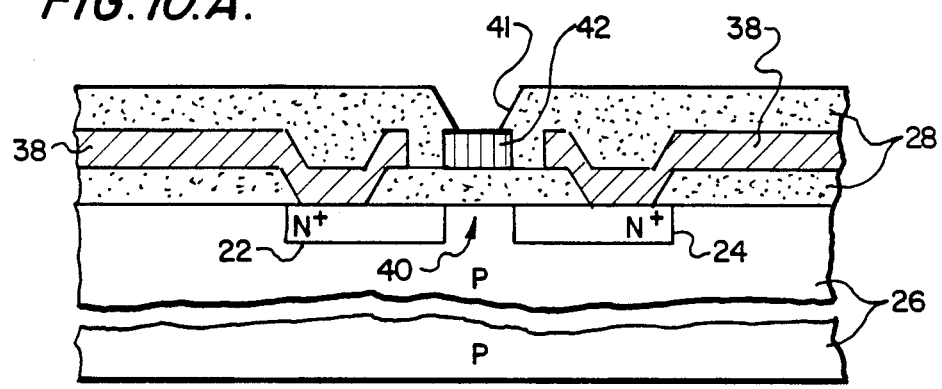
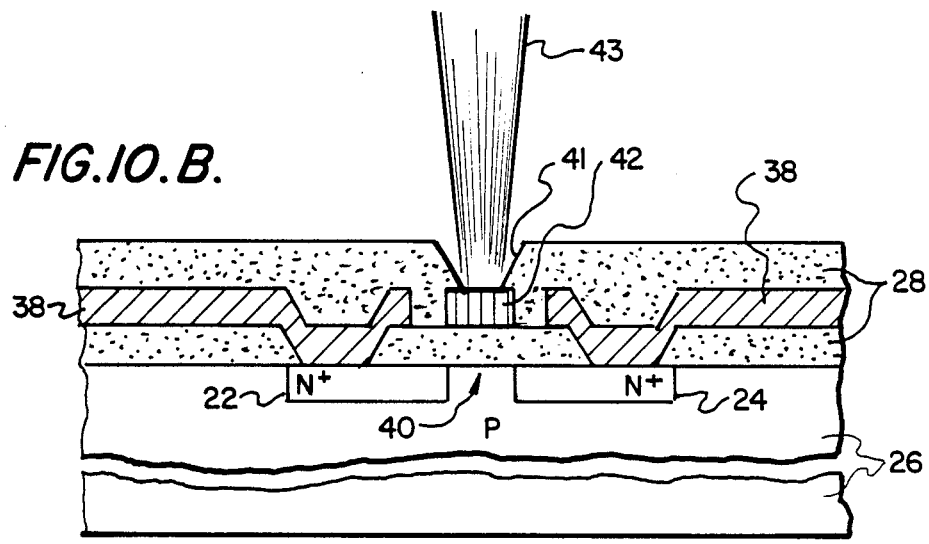
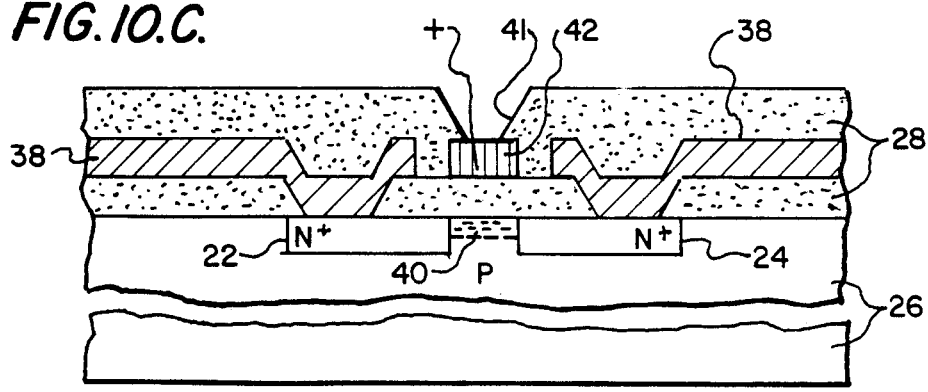

METHOD AND APPARATUS FOR SECURING INTEGRATED CIRCUITS FROM UNAUTHORIZED COPYING AND USE

BACKGROUND OF THE INVENTION

1. Field of the Invention

This invention relates to security systems and methods for integrated circuits, and more particularly to systems and methods for protecting integrated circuit systems from unauthorized copying and for controlling their use.

2. Description of the Related Art

One of the major problems with integrated circuits (ICs) is in providing security for both the design and use of the circuits themselves and for systems which incorporate the circuits. It is possible to reverse engineer most (ICs) simply by sectioning the device, photographing its circuitry and fabricating duplicate circuitry from the photographs. The copier can thus obtain the benefit of the completed circuit design at a small fraction of the cost involved in the original design.

Controlling the use of systems which incorporate ICs is another persistent problem and need. For example, it would often be desirable to base license fees for software/hardware systems upon the number of times the system is used, or the duration of system use. However, no reliable and secure method is currently available for the licensor to remotely monitor the use of many different licensed systems. Another example of the need for use control is that often a supposedly secure computer system will have numerous different entry points, each of which is provided with a control mechanism which is accessible only by authorized persons. However, if an unauthorized individual obtains the necessary information or equipment to gain access to one of the entry points, that same information or equipment might be used to gain access to the other entry points and thereby compromise the entire system. A similar problem exists in the case of IC systems which are produced in quantity, each system having the same security mechanism. Once one of the systems is comprised by obtaining unauthorized access, all of the other systems are similarly compromised.

SUMMARY OF THE INVENTION

In view of the above problems, the purpose of the present invention is to provide a security system and method for a wide variety of ICs and systems incorporating ICs. This security system can be used to prevent the copying of the design of the IC, and to control the use of the IC. Controlling the use of the IC will, in turn, allow the control of the use of any system into which the IC is incorporated. This use control will result in safeguarding the system against any form of unauthorized use of the system.

These goals are achieved with a technique that can be customized for many different types of IC systems, and uses only a very small portion of the available chip area.

In accordance with the invention, an IC which is designed to perform a particular circuit function has at least one additional circuit element added to it which does not contribute towards that function. Rather, the additional element is connected with the remainder of the IC circuitry to inhibit its proper functioning in case of an attempted unauthorized use of the system, which use can involve either copying or circuit operation. The identities of the additional circuit elements are disguised in one or more of a variety of ways to increase the system's effectiveness.

In an implementation which is designed primarily to prevent copying, the additional circuit elements have the visible appearance of being functionally interconnected with the remainder of the IC circuitry. However, they include a physical modification which is not readily apparent to a copyist, but which causes them to function in a different manner. The modification can be created with a focused ion beam (FIB), a laser beam, or an electron beam which injects electrical charge into isolated locations within the circuit to produce modified circuit performance. One approach is to provide the additional element in the form of an apparent metallized circuit connection which is actually divided into separate sections by a very narrow, non-conductive gap cut with the FIB or laser beam. The gap is large enough to electrically separate the sections, but narrow enough so it is not readily visibly preceptible. Another approach is to provide an additional element with a doped semiconductor region, in which the doped region is subjected to an ionized implant sufficient to change the function of the element from its visibly apparent function. An ionized implant of the substrate material can be used to disorder the lattice structure of the doped region, or the doping level of the region can either be increased or decreased to change the region's conductivity to a point at which the overall element's operational characteristics are substantially altered.

In another embodiment which is intended primarily for use control, as opposed to copy control, each of a plurality of discrete ICs is provided with an additional element in the form of a control code subcircuit having a control code. The control code subcircuit inhibits proper functioning of the remainder of the IC unless it is properly addressed in accordance with its code. Each IC can be provided with a mechanism for inhibiting its proper function either immediately upon being improperly addressed, a predetermined period of time after being improperly addressed, or after being improperly addressed a predetermined number of times. The control code subcircuit for each IC is at least partially formed with a FIB, which is programmed to alter the control code subcircuit from IC-to-IC. Thus in the limit every individual copy of an integrated circuit implementation can be equipped with its own unique control code. Some of the control code subcircuit elements may also be formed with apparent functions which are different from their real functions, using the FIB or laser technique for copy control.

Where a number of different ICs from parts of an overall functional system, the ICs can be arranged in a serial ring with each IC transmitting a code signal which "unlocks" the next IC and permits it to function properly. The first IC is addressed by an external control unit, which also receives the transmission from the last IC in the ring. Proper functioning of the overall system is inhibited unless each of the ICs receives its correct control code. Where the ICs are mounted on different circuit boards, communication may be established with infrared electromagnetic transmission. Each control code of each IC consists of a multiplicity of digital bits (for example: 8, 16, 32). Thus in an implementation where a multiplicity of ICs form a serial ring, the number of unique combinations will be extremely high. This large number of possible combinations of control codes makes it virtually impossible to circumvent this security system established by these special ICs.

In addition to the control code subcircuits, each IC in a use control system may be provided with an identification subcircuit which can be externally read. This enables the IC to be uniquely identified so that its corresponding control code can be located in a lookup table or the like to gain access to the IC.

The circuit modification possible with the FIB or equivalent beam have two characteristics: (1) they can be arranged to be unobservable, (2) the modification can be customized at will, down to an individual IC chip of a wafer. The unobservability aspect of the method is a key characteristic for design protection. The customization aspect of the method, on the other hand, is a key characteristic for use control.

The system software can interrogate the identification subcircuit and generate the correct control code for that particular IC. This "handshake" will uniquely link individual copies of the software to individual copies of the hardware. This hardware/software link, in turn generates many applications in the area of system use control as well as software copy protection and license enforcement.

Other features and advantages of the invention will be apparent to those skilled in the art from the following detailed description of various embodiments, together with the accompanying drawings, in which:

DESCRIPTION OF THE DRAWINGS

FIG. 4 is a plan view of an IC illustrating possible placements of an apparent circuit element in a circuit having thousands of logic gates;

FIG. 10(a), 10(b) and 10(c) are sectional views of an FET modified by an electron beam in accordance with the invention;

DETAILED DESCRIPTION OF PREFERRED EMBODIMENTS

Figure 1:
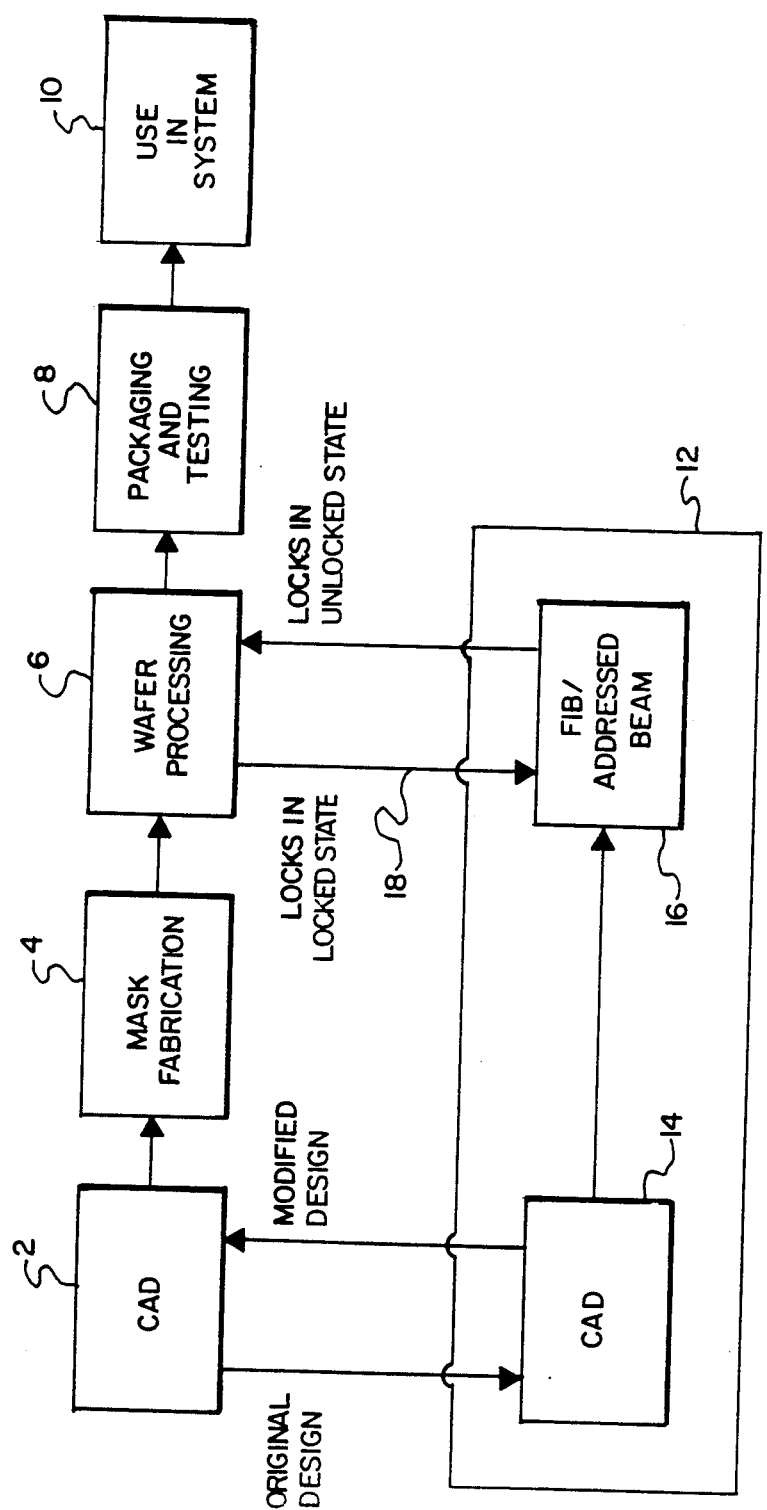
FIG. 1 is a block diagram of an IC fabrication process in which a copy control feature is added in accordance with the invention.

FIG. 1 illustrates the fabrication sequence for an IC which is to be secured against unauthorized copying in accordance with the invention. A first computer aided design (CAD) system 2 is used to design the IC in a conventional manner to perform its intended function. The conventional fabrication sequence is illustrated at the top of the figure, consisting of a mask fabrication step 4 which uses the IC design layout data produced by CAD 2, wafer processing 6 using the masks, packaging and testing 8 of the resulting ICs, and finally actual field use of the ICs in overall systems 10. In accordance with the invention, this fabrication sequence is modified by the control elements in block 12 to secure the IC against unauthorized copying. The original design from CAD 2 is delivered to another CAD system 14, which modifies the IC design by providing for additional circuit elements that are used solely for copy control. These circuit elements do not interfere with the normal operation of the IC, but are provided to frustrate attempted copying. The modified circuit design is sent back to the first CAD 2, which then incorporates the additional copy control circuit elements into the mask fabrication.

The second CAD system 14 also programs a focused ion beam (FIB) 16 which is used to activate the copy control system. A FIB is a system that produces an ion beam and focuses it down to a very small spot. Current FIB systems can achieve spot sizes considerably less than one micron, or smaller than the smallest surface features generally found in ICs. One suitable FIB system is described in an article by V. Wang. J. W. Ward and R. L. Seliger, "A Mass Separating Focused-Ion-Beam System for Maskless Ion Implantation", J. Vac. Sci. Technol., 19(4), Nov./Dec. 1981, pages 1158–1162.

The additional circuit elements which are added for copy control may be considered to function as "locks" in the sense that the circuit cannot successfully be copied unless the additional elements are copied in their "unlocked" state. The IC fabrication process depicted in FIG. 1 produces circuits with their "locks" in their "unlocked" state. The sequence of fabrication steps is as follows: the masks which have been modified in the manner described above are used to perform the initial segment of fabrication on the wafers. The wafers are then delivered to the FIB system in which the necessary FIB processing is carried out to convert the "locks" from their "locked" state to their "unlocked" state. Then the wafers are returned to normal processing where the remaining steps in the fabrication sequence are carried out resulting in completely processed wafers. The wafers are then packaged and tested in the conventional manner. The FIB processing conducted on the wafer involves directing the FIB to at least some of the circuit elements to alter their electrical characteristics. However, the extremely small size of the FIB spot is utilized to provide an electrical alteration that is not readily visibly apparent. Thus, if the IC is photographed by a copyist, the altered additional circuit elements will retain the visible appearance of their unaltered state, and the copyist will reproduce the IC with all of the additional circuit elements in their unaltered states. Thus, while the IC copy will have the same visible appearance as the original IC, it will not function the same electrically. In particular, the IC copied in accordance with the visible appearance original IC will not function correctly, thus being useless to the copyist. Various techniques for using the FIB to alter the additional circuit elements in this manner are described below. This alteration may be considered to place the "locks" in an "unlocked" state. After fabrication, the copy-secured IC is packaged and tested in the normal fashion, and then distributed for use in field systems. The above described method produces "locks" that are "unlocked" once during the fabrication process. Since these "locks" are never again returned to their "locked" state, these "locks" are referred to as "static locks". The utility of this additional qualifying term will become apparent in the following description.

While the small spot size is important, there are two other characteristics that are even more important. First, the fact that the FIB is an addressable beam makes possible the desired customization. Other beams are also addressable; for example, an electron beam. The second important characteristic is that in one approach the FIB is used as a tool which introduces dopant ions into the IC substrate, and it is the introduction of these dopant ions that alters the electrical characteristics of the device. The extreme resolution possible with the FIB becomes useful in the creation of microscopic cuts, but in the limit all cuts generated with the FIB are observable because they involve the removal of material. In contrast, it has been demonstrated that major changes in electrical functions can be produced by the introduction of dopant ions via the FIB in a manner that is totally unobservable. Thus, this unobservability when combined with the customization and the very large number of digital combinations that are possible make the approach of securing ICs from unauthorized copying and use very powerful.

Figure 2:
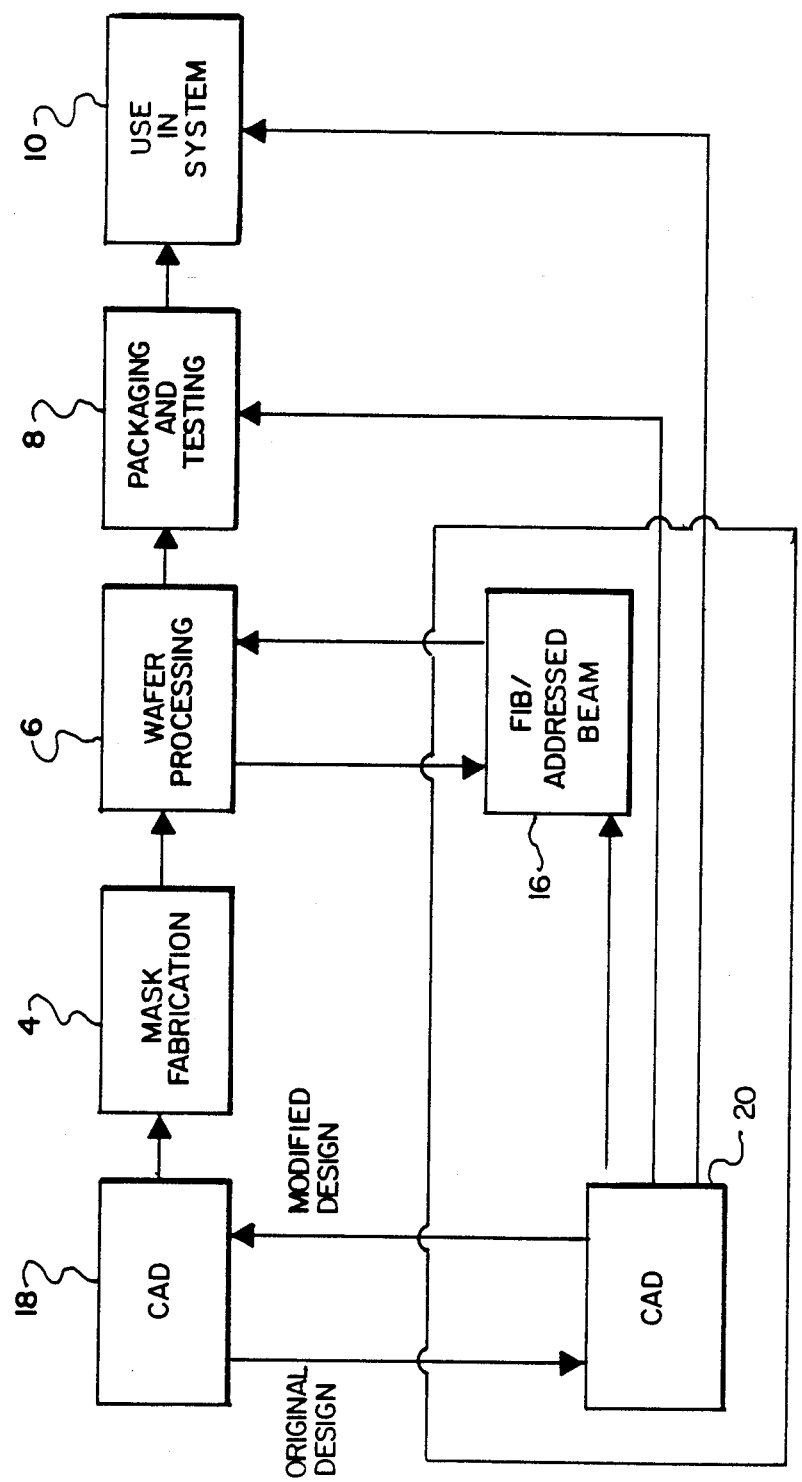
FIG. 2 is a block diagram of an IC fabrication process in which a use control feature is added in accordance with the invention.

The fabrication sequence for providing use control security is illustrated in FIG. 2. The CAD system used for the basic IC design is designated CAD 18. The basic circuit design of the IC does not vary from chip to chip. The CAD system which is used to add the use control feature is designated CAD 20. Use control is achieved through the generation of "dynamic locks". This means that every time the circuit is used, which translates to every time the system in which the IC resides is powered up, the "key" or "control code" must be provided in some manner to the IC to change its state from one of being "locked" to one of being "unlocked". This also means that the additional structures in the IC design must so operate as to come up in their "locked" state every time the system is powered up. Circuit design procedures to achieve this are well understood. The fabrication sequence for producing ICs whose use can be controlled starts in a manner similar to ICs fabricated with copy protection. The IC is designed in the standard manner, this design is transmitted to the CAD system 20 where additional structures are incorporated, and the modified design is returned to the first CAD system 18 which produces mask fabrication data. Masks are fabricated in accordance with the modified design and used for wafer fabrication. The standard wafer fabrication is interrupted and wafers are delivered to the FIB system. The FIB system is provided with design data from the second CAD system 20. The FIB system, using this design data, modifies the additional structures in the wafers which have been delivered to the FIB system. This modification incorporates two entities into each and every chip (or IC) on every wafer. The first entity is a "control code", and the second is the "chip identification" or "chip ID". Since each chip is modified individually, it is possible, and in fact desirable for use control, to implement a unique control code and chip ID for every chip.

After the FIB processing, the wafers are returned to the standard wafer processing line where the remaining fabrication steps are performed on the wafers. The wafers are then diced, packaged, and delivered to testing. During testing, as well as any subsequent use of these ICs, the correct control code must be provided in order for the circuit to function correctly. Thus, during testing the chip ID is first read from the IC being tested. Then, using the data base generated by the FIB system, the tester determines the correct control code for the IC being tested. Therefore, the database relates chip ID to control code. The control code is supplied to the IC under test and standard testing is then carried out. The procedure followed during initial testing is also followed during system use. Thus, when a system containing one or more ICs equipped with the use control mechanism is powered up, the power-up sequence must go through a "handshake" in which the chip ID is acquired and the appropriate control code is supplied to the IC. This power-up sequence can reside in software and/or firmware. Since the "unlocking" of the use control "lock" is carried out each and every time the IC is used, these "locks" are referred to as "dynamic locks" to contrast them to the "static locks" associated with copy control procedures.

The unobservability feature of the FIB processing is important for copy protection. The customization feature of the FIB processing is important for use control. However, it should be understood that FIB processing for use control is a superset of FIB processing for copy protection, in that use control FIB processing can be easily arranged to be unobservable.

Figure 3:
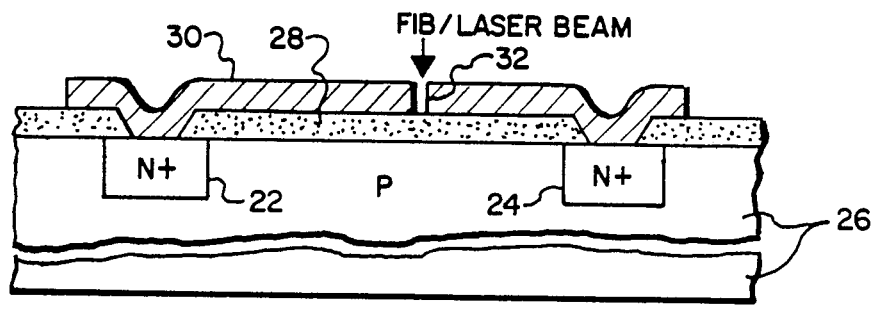
FIG. 3 is a sectional view of an apparent circuit element with electrically separated metallization sections disguised as an apparent metallized connection.

One way of implementing a copy control security system, which can also be used for use control as described later, is shown in FIG. 3. A circuit device is fabricated which, for illustrative purposes, consists of a pair of n+ doped regions 22, 24 set in a p-type substrate 26, with an oxide layer 28 overlying the substrate. A metallization layer 30 is formed over the oxide layer 28, and contacts the n+ regions 22, 24 through windows in the oxide layer. When initially formed, the metallization layer 30 completes a short circuit connection between the two n+ regions. In accordance with the invention, a very narrow cut 32 is made in the metallization layer between the two n+ regions. The cut is wide enough to electrically separate the two n+ regions, but narrow enough so that it is not readily visibly apparent to a copyist. Thus, if an attempt is made to copy the circuit by the usual photographic technique, the open circuit between doped regions 22 and 24 will appear as a continuous metallized connection, and the copyist will implement his own circuit with such a connection. The apparent connection provided by metallization 30 is designed into the overall circuit so that the circuit will function properly if the two sections left by the cut are electrically separated from each other, but will not function properly if a continuous electrical connection is actually made. Thus, a copyist will be deceived into providing an actual connection, and as a consequence his circuit will not function properly.

The narrow cut is preferably made with a FIB, which can cut with a spot size on the order of tenths of microns. While a FIB is preferred, it might also be possible to employ a focused electron beam or focused laser beam device for this purpose. In general, any serial writing beam machine in which the dimension of the beam is no greater than the smallest feature size of the element to be cut may be employed.

Depending upon the operating voltage levels, it may be difficult to obtain cuts which are so small that they cannot readily be seen, and yet still maintain electrical isolation between the metallization sections. However, many ICs are quite complicated, employing perhaps 50,000 gates or more. With such circuits the presence of apparent circuit elements such as the sectioned metallization connection of FIG. 3 can still be effectively hidden from a copyist by locating such apparent elements at several random locations in the circuit. This situation is illustrated in FIG. 4, in which a complicated IC 33 having thousands of logic gates includes a number of apparent circuit elements 34 at different locations in the overall circuit (the relative size of apparent elements 34 is exaggerated). Even if the cuts are wide enough to be visible under reasonably close inspection of the individual apparent circuit elements, it is highly unlikely that their presence would be detected because they are hidden among the very large number of real circuit elements.

Most integrated circuits have two or more levels of metallization. It would be relatively simple to have a cut at the first level metallization, and then to cover up the cut with a metallization structure in the second level of metallization. If the circuit is complex enough and the cut narrow enough, this "cover up" will render the cut unobservable.

Figure 5:
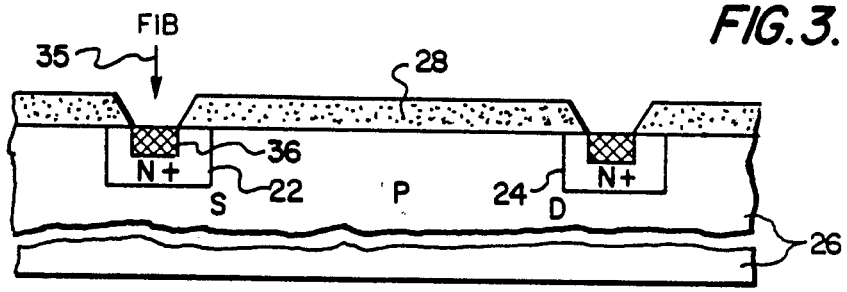
FIG. 5 is a sectional view of a partially formed apparent IC circuit element illustrating the alteration of a doped region in the element to give it an electrical characteristic different from its visibly apparent function.
Figure 6:
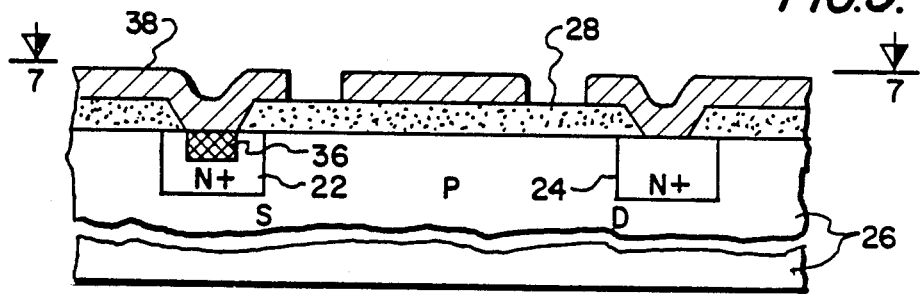
FIG. 6 is a view of the circuit element shown in FIG. 5 after fabrication has been completed.
Figure 7:
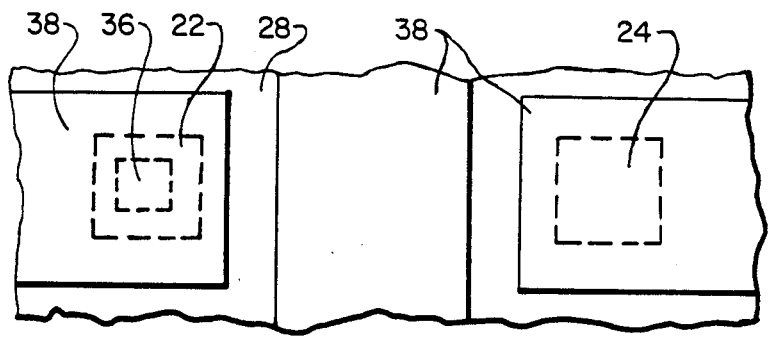
FIG. 7 is a plan view of the circuit element shown in FIG. 6.

Another approach to providing additional circuit elements which have the visible appearance of being functionally interconnected with the remainder of the IC circuitry, but which actually include physical modifications which are not readily apparent to a copyist, is illustrated in FIGS. 5–7. The apparent element employed in this illustration is a field effect transistor (FET), but in general any circuit device which relies upon one or more doped regions can be used. Other examples are bi-polar and ECL transistors, and GaAs devices.

The FET shown in FIG. 5 is at an intermediate stage of fabrication. Two n+ doped regions 22 and 24 are set in a p-type substrate 26, as in the embodiment of FIG. 3. The insulative oxide layer 28 covers the substrate, with windows opened over each of the n+ doped regions. To an observer one of the n+ regions will appear as a source and the other as a drain, with the intervening substrate immediately under the oxide layer providing a channel.

The normal farication process is not interrupted, and one of the doped regions 22 is subjected to an ion implant from a FIB 35. The FIB ion implantation continues until the conductivity of the doped region 36 under the window is so "damaged" or altered that it no longer effectively functions as a source or drain. The implantation is kept at a low enough level that it does not physically gouge out any significant portion of the doped region, but is high enough to sufficiently alter the conductivity of the region adjacent the window to prevent true FET operation. To ensure that the entire window area is altered, the FIB is preferably overscanned just beyond the window area during each scan. The FIB is controlled in the usual raster scan fashion to ensure complete coverage.

The FIB is preferably employed to disorder the lattice structure of damaged area 36, and thereby make it highly resistive. The lattice disordering can be accomplished by using ionized ions in the FIB which are obtained from the same type of material as substrate 26. For example, with a silicon substrate $Si^{++}$ ions would be employed. For a GaAs substrate, either Ga or As ions might provide the desired lattice disordering, although this has not yet been demonstrated.

Instead of disordering the lattice structure, the damaged area 36 could be created by altering its doping level to increase its resistance. Implants of phosphorous (P) or arsenic (As) ions are typically used to create an n+ doping such as region 22 (NMOS devices), while boron (B) ions are typically used for p+ doping (PMOS devices). The n+ region 22 could be doped with boron to reduce or even reverse the polarity of its doping level. The B, As, P ions discussed above serve a dual purpose with respect to the proposed application. First, as energetic ions they produce damage or disorder in the crystal lattice. This damage reduces the electrical conductivity of the region, thereby modifying the devices characteristics. Second, these ions, if activated by any subsequent thermal processing, result in doping the crystal lattice, thereby providing electrical carriers of one polarity or the other. This second feature can be used to modify the electrical characteristics of the device in more elaborate ways then simply producing damage in the lattice; for example, by the formation of additional PN junctions: A doped region whose lattice structure has been disordered will not become conductive under any normal circumstances.

After completion of damaged region 36, a metallization layer 38 is laid down over the oxide layer 28, as shown in FIG. 6. The metallization is etched to form separate source, drain and gate contacts, and extends down through the source and drain windows in the oxide layer to contact the doped regions 22 and 24. The contact with doped region 22 is not effective, however, because it has been converted into a non-conductive region 36 through the application of the FIB. Thus, although the device has the visible appearance of a normal FET, it is non-functional. The lack of functionality cannot be perceived by a copyist because there is no visible evidence of the doped region having been altered, and also because the damaged area is covered by metallization layer 38. A top view of the apparent FET, as in FIG. 7, does not reveal any evidence of the alteration.

Figure 8:
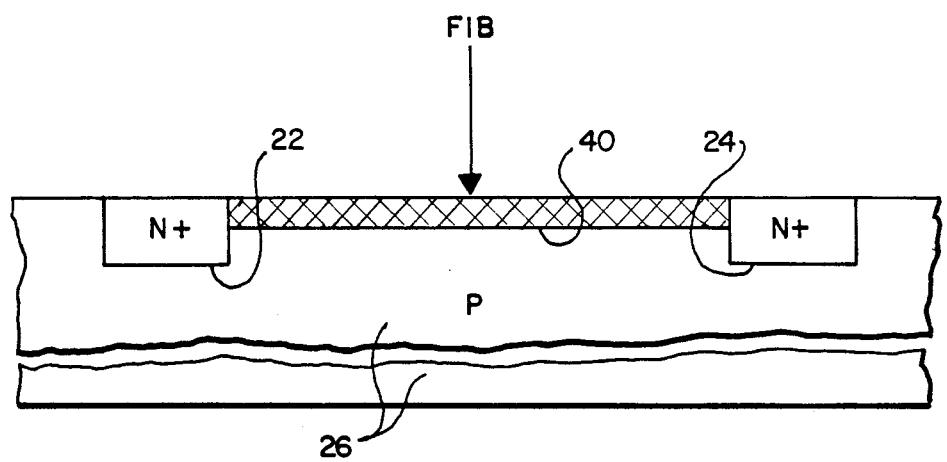
FIG. 8 is a sectional view of a partially formed apparent FET in which the channel area is altered by a FIB in accordance with the invention.
Figure 9:
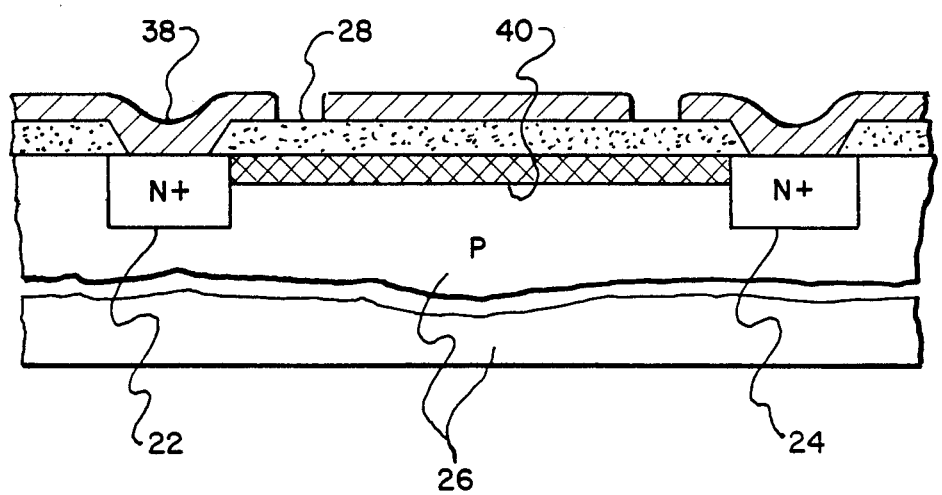
FIG. 9 is a sectional view of the apparent FET shown in FIG. 8 after fabrication has been completed.

An alternate approach to creating a physical modification that causes a circuit element such as the FET discussed above to have the visible appearance of a functional device, but in practice to be non-functional, is illustrated in FIGS. 8 and 9. In this approach the channel 40 between the source and drain is functionally damaged to alter the FET's threshold level for turn-on. Again, a FIB is used to created the damage. The channel lattice structure could be disordered with an implant of $Si^{++}$ ions for the silicon substrate illustrated, thereby making the channel 40 totally non-conductive. Alternately, the channel can be doped with P or As ions so that it is n+ and always conductive. This in effect alters the device from an FET to a short circuit. It is not necessary that the channel be made fully open or fully short circuited; changing the operating current and voltage levels by lesser amounts can also make the device functionally inoperative. This introduces an "analog" condition in which states between fully functional and fully non-functional are achieved, as opposed to the "digital" examples discussed above in which the modification produces a change from fully functional to fully non-functional. The two main categories of modification are thus cuts and doping. The doping modification has three subcategories: increasing the conductivity, decreasing the conductivity, and rendering the region completely non-conducting. In order to increase or decrease the conductivity, a doping step, performed with a FIB, is followed by a thermal anneal step which serves to electrically activate the dopant ions introduced into the region by the FIB. In contrast, the thermal anneal step is deliberately avoided in situations where the region is to be rendered completely non-conducting. This non-conducting state is produced by the damage caused by the FIB-introduced ions.

Another approach to creating a modification is illustrated in FIGS. 10(a), 10(b) and 10(c). Elements which are common with those in FIGS. 8 and 9 are indicated by the same reference numerals. The modification is of a functional nature in that an FET conduction state is altered by generating a permanent gate voltage. In normal operation, the voltage applied to the gate 42 of an FET varies in accordance with the operation of the circuit. In FIGS. 10(a)-(c) an N-channel FET, or NFET, is depicted. When a positive voltage is applied to the gate of an NFET, negative charge is induced in the channel 40 of the device, forming a conductive path between the source 22 and drain 24 of the NFET. With this conductive path present the NFET conducts current, and if it is not present the NFET does not conduct current. The NFET illustrated is unusual in that the gate structure 42 is not electrically connected to any other part of the circuit, and is referred to as a floating gate. In this embodiment an opening 41 is in the top layer of passivation 28 such that a portion of the floating gate 42 is exposed. A focused electron beam 43 is then directed through the opening for the purpose of injecting a net positive charge into the gate structure 42. Since the gate 42 is surrounded by the passivation 28, this injected charge would remain unchanged for an indefinite period of time (periods of years have been demonstrated under normal operating conditions). The electron beam 43 conditions for injecting a new positive charge into the gate 42 are well understood. Thus, after electron beam modification a permanent negative charge would be present in the channel region 40 of the NFET, rendering that NFET conductive. NFETs with floating gates which did not receive this positive charge would remain in their original non-conductive state. If the FET was a "P-channel" device, the electron beam 43 conditions (mainly its energy) would be modified to inject net negative charge.

The discussion thus far has been directed solely to the prevention of unauthorized copying. The invention also has a very important application to preventing the unauthorized use of, or access to, an operating system. In the most general sense an operating system for this purpose is any system that relies on the correct operation of one or more ICs which are a part of that system. If these ICs function correctly the system delivers the expected performance and operation; if the ICs do not function correctly, the system then does not perform its intended purpose. In order for "use control" to work as intended, there must be a decision-making procedures embedded in the system. It is this procedure which decides whether the IC will function correctly or incorrectly. The execution of this decision-making process has to be triggered or initiated in some manner. Proposed events for initiating this procedure are: system turn-on, attempt to access the system by a user, or the passage of a predetermined time. The decision-making process can consists of a system status verification procedure and/or user authentication procedure. These procedures can reside (or be stored in) the inherent physical configuration and base-line operation of the components comprising the system, or in a logical algorithm consisting of a sequence of steps stored in firmware or hardware, or in the same logical algorithm stored in the operating system software associated with the system. The activity of determining the status of the system has the additional purpose of safe-guarding the "use control" mechanism installed in the system. This safe-guarding is accomplished by identifying the presence of unique system components, thereby confirming that no component has been replaced for the purpose of bypassing the "use control" mechanism.

For the use control application each IC made in accordance with the invention may be considered to have three functions: (1) a nominal function, which is the intended use of the IC; (2) an interruption function; and (3) a control function. The nominal function is simply the original IC function before modification to add the advantages of the invention. The interruption function is added for the purpose of interrupting the correct operation of the nominal function. Whether or not the interruption function is allowed to interrupt the operation of the nominal function is controlled by the control function. If the control function generates the appropriate control output to the interruption function, then no interruption occurs. If the interruption function does not receive the required control output from the control function, then interruption does occur.

The invention makes use of the fact that a basic characteristic of many systems containing ICs is that they are routinely turned off and back on again in a repeated cycling pattern. The use control aspect of the invention takes advantage of this relatively frequent turn-on and turn-off. When an IC system such as a computer is turned on, the first activity which occurs is the booting of the operating system software from the disk to the processor memory, or a similar system initialization procedure. This booting activity has certain characteristics which are useful to the implementation of use control: (1) it takes at least several seconds to complete; (2) it is a transient activity which is difficult or impossible to track in any detail; and (3) its occurrence is signalled to all ICs in the system via the re-application of power (excluding ICs powered by battery back-up).

A use control function is provided in the form of a control code subcircuit on the IC which interrupts or inhibits the proper operation of the nominal IC function unless it receives the correct control code. A key element is that the control codes are changed from one IC to another, thus preventing access to the entire system, or to another system, even if one of the codes is compromised.

Figure 11:
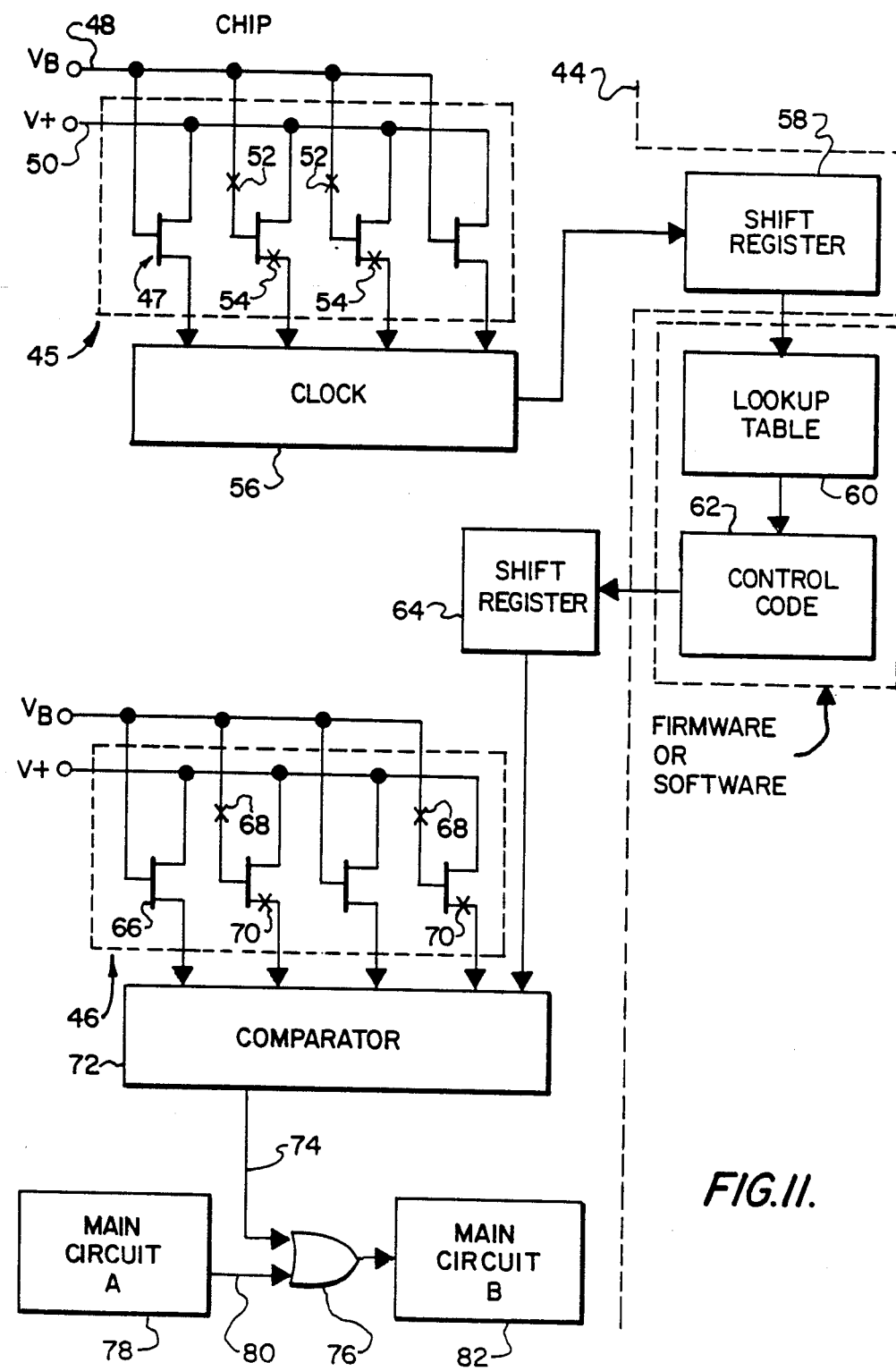
FIG. 11 is a block diagram showing the sequence of identifying an IC and addressing it so as to enable its proper functioning in a use control embodiment.

One implementation of the use control approach is illustrated in FIG. 11. Circuitry internal to the IC is shown to the left of vertical dashed line 44, while apparatus external to the chip is to the right. The security circuitry includes an identification subcircuit 45 which allows the chip to be identified, and a control code subcircuit 46 which actually provides the security mechanism. Identification subcircuit 45 is shown as a 4 bit digital circuit, with each bit provided by an apparent FET 47. In practice, a larger number of bits can be used if a more complex and difficult to decipher code is required. In the example shown, the FETs are enhancement type, with their gates biased from a bias line 48. Transistor current is provided from a positive voltage line 50 to the source of each device. Separate circuitry can be provided to keep some of the FETs off while others are on, with the digital pattern of on devices establishing a unique identification code for the chip.

Although the identification code could be provided by a simple combination of open circuit and closed circuit elements, it is preferred that each of the FETs 47 have the visual appearance of a functioning conductive device, but that some of them be rendered non-operational by the techniques discussed above. For example, the bias lines to some of the FETs could have a narrow FIB cut 52 which opens the bias line and prevents the device from conducting. Alternately, the doped regions forming the source or drain of selected FETs could be altered as described above with a damaged area 54 that is not visibly perceptible but keeps the element open-circuited. A hidden channel modification could also be provided, as described above.

The binary identification code from identification subcircuit 45 is fed into a clock 56 which clocks out the identification code to the shift register 58. This produces a "handshake" between the chip and the external access device that enables the chip identification to be successfully obtained. The shift registry 58 submits the chip's identification code to a lookup table 60, which stores the chip control codes corresponding to each of the different identity codes. Lookup table 60 and control code 62 reside in the system firmware or software. The lookup table 60 yields the particular control code 62 for the identified chip, which is then input into a shift register 64 on the chip. The chip's control code subcircuit 46, which provides the security control function, is constructed similar to the chip identification subcircuit 45. It includes a binary series of apparent FET bits 66, some of which are held non-conductive by a FIB cut 68, damaged doped region 70, or other hidden technique discussed above. Again, although only four bits are shown, in practice there would generally be a greater number of cuts to accommodate a larger number of different binary address codes for the various chips.

The externally applied control code held in shift register 64 is compared with the internal control code from control code subcircuit 46 by a comparator 72. The output of the comparator indicates whether the externally applied control code matches the internal control code. If the internal and external codes match, the IC is permitted to function as intended. If there is not a match, indicating that the correct control code has not been applied to the use-control IC, the comparator output is used to inhibit proper operation of the IC.

Many different schemes can be envisioned for using the comparator output to control the operation of the remainder of the IC. In one fairly simple approach, the comparator output line 74 is connected to one input of an AND logic gate 76. The AND logic gate 76 is connected within the main IC to separate the main circuit into two portions which are functionally connected only when the logic gate 76 transmits, without alteration, the logic state occurring at its input 80 to the output of the logic gate 76. If the comparator 74 is logic high, the logic gate 76 will reproduce at its output whatever logic state is assumed by its second input 80. Under these conditions the presence of the logic gate 76 does not modify the operation of the main circuit. One portion 78 of the main circuit is connected by lead 80 to the other input of the AND logic gate 76, the output of which is connected to the remainder of the main chip circuit 82. Thus, the two portions of the main circuit are electrically isolated and cannot function properly in the absence of a logic high signal from comparator 72 indicating that the externally applied control code matches the chip's internal control code. This provides an element of security in preventing unauthorized use by anyone not knowing the proper control code, or otherwise controlling or monitoring the IC system. The FIG. 11 system is merely an example of many different implementations that will occur to those skilled in the art of circuit design and communications systems.

Another important feature of the invention is that, when a FIB or equivalent tool is used to implement the control code subcircuit code, the code for each individual IC of every wafer in a production line can easily be changed to give each chip a unique control code. If successive chips from the production line are each placed into different systems, the differences in control codes will ensure that the other systems remain secure even if unauthorized access is obtained to one of the chips. In this respect each of the systems into which the differently coded ICs are placed can be viewed as a subsystem within an overall master security procedure, even though the subsystems are not functionally interconnected. The difference in control codes secures the master security procedure as a whole, even though one of its subsystems may be compromised.

Figure 12:
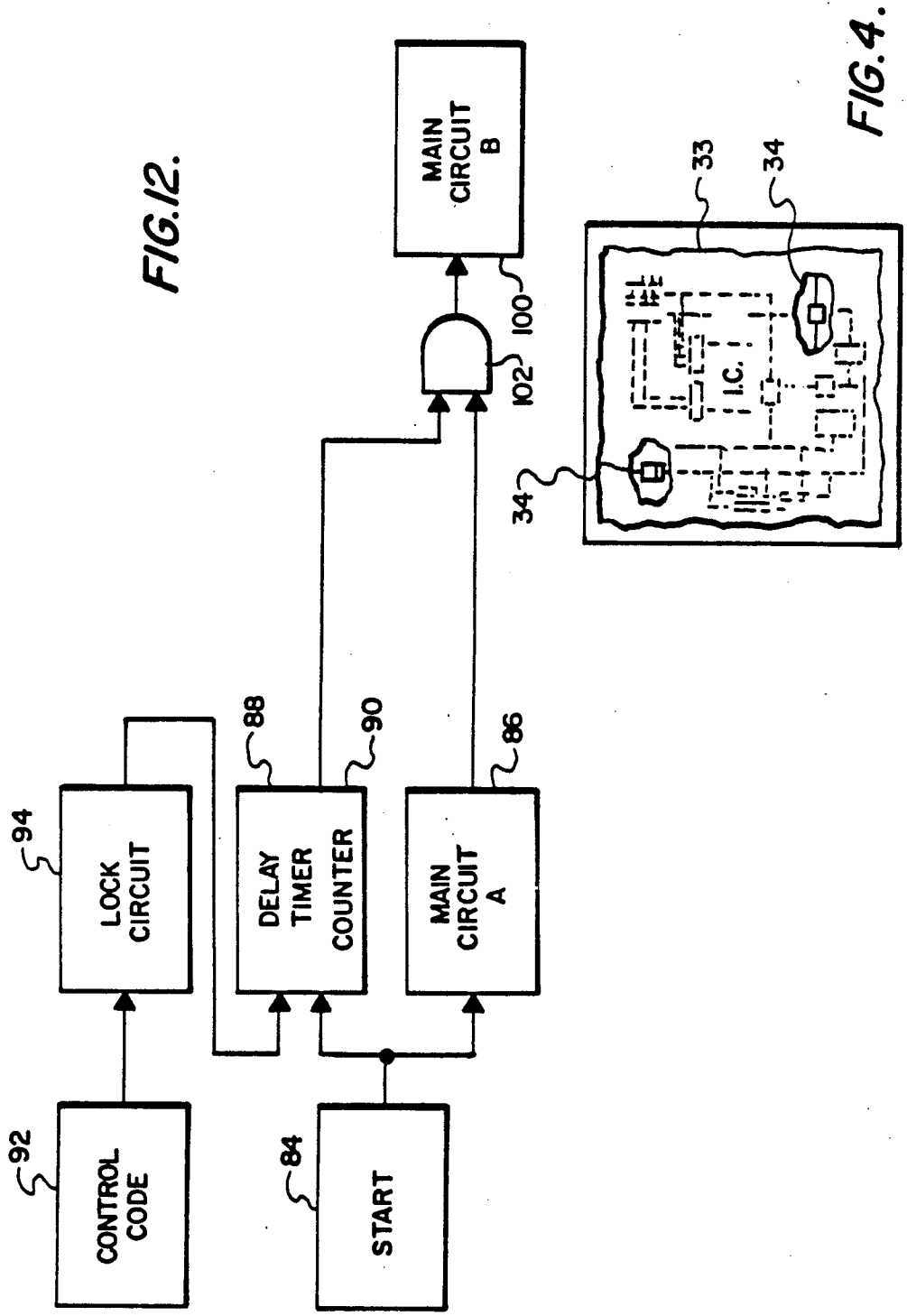
FIG. 12 is a block diagram of alternate use control embodiments in which the control function is delayed for either a predetermined period of time, or for a predetermined number of uses, together with an explanatory logic table.

The security control system described thus far provides for immediate failure of the IC in case an improper control code is used to address the chip. It may be desirable in certain circumstances to delay the onset of failure. For example, if the system is paid for based upon use, a certain number of operations or a certain period of operating time may be permissible before the system is shut down in the absence of a proper control code to reset the system. FIG. 12 illustrates two implementations of this concept. A signal from a starter 84 is connected to one portion 86 of the main IC circuitry, and also to either a delay timing device 88 or a counter 90. To enable uninterrupted operation, an externally applied control code 92 is delivered to a lock circuit 94, which may be implemented by the control code subcircuit 46 and comparator 72 of FIG. 11. The lock circuit output is delivered to the delay timer 88/counter 90. The output of delay timer 88/counter 90 controls the functional interconnection between the two sections 86 and 100 of the main IC circuitry by means of AND gate 102. The outputs of delay timer 88/counter 90 and main circuit 86 are both applied as inputs to AND gate 102, the output of which completes a connection with the remaining portion of the main circuitry 100. In the absence of a logic high signal from the delay timer 88/counter 90, the output of the main circuit A 86 is not correctly transmitted to the input of the main circuit B 100 and proper operation of the IC is inhibited. The logic states of the various circuit elements involved in use control (88, 90, 94) are so arranged that the logic gate 102 transmits the output of main circuit A 86 to the input of main circuit B 100 only when the correct control code is supplied and the delay timer 88 or counter 90 permits correct operation. One of numerous examples of a condition that would inhibit correct operation would be if the current composition of system components were not as intended; for example the copy of the software did not match up properly with the copy of the hardware. Another type component mismatch would occur if any one of the modified hardware components had been replaced by another component.

The delay timer 88 comes into action a predetermined delay time after circuit operation has commenced to disable the IC in the absence of a proper control code, while counter 90 counts up the number of times the IC is addressed and disables it after a predetermined number unless it has been properly addressed. For any particular chip either the delay timer or the counter, or both, may be used.

After the timer or counter has reached its present limit its output switches to a logic 0, disabling the system. Subsequent incorrect control codes will not change the lock circuit output, and the system will remain locked out. If, however, the correct control code is reapplied, the lock circuit output will be logic 1, which resets the timer/counter to also produce a logic 1 output. This in turn again enables system operation. Thus, the system will function properly for an initial period of time or number of operations, but will thereafter be disabled in the absence of the proper control code.

Figure 13:
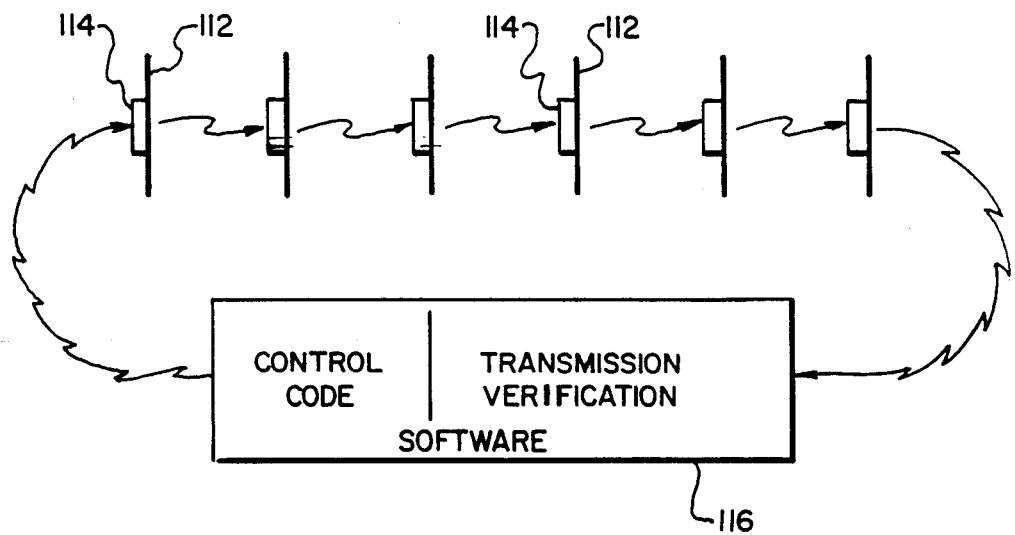
FIG. 13 is a block diagram of a use control embodiment in which control codes are transmitted between ICs on separate circuit boards to establish a security ring.

Another application of use control in accordance with the invention is illustrated in FIG. 13. The secured system has several printed circuit (PC) boards 112, each of which has mounted thereon an IC 114 modified for use control such as those previously described. In addition, each of these modified ICs has an associated transmitter which transmits a control code signal to the next PC board, and an associated receiver which is adapted to receive a transmitted control code signal from the previous PC board. An external software verification unit 116 transmits a control code to the receiver of the first IC. If the correct control code is used, the circuit lock for that IC will be unlocked and the IC will be allowed to function properly. In addition, the transmitter for the first IC transmits a control code signal which matches the unique code for the IC modified for use control on the second PC board. This signal is received by the second IC's receiver and causes it to unlock the circuit lock for the second IC and allow it to operate properly. In a similar fashion each successive modified IC transmits a coded control signal corresponding to the control code of the next IC, and receives from the previous IC's transmitter a control signal which enables it to operate. The transmitter for the last IC transmits a coded signal back to the software verification unit 116, which verifies that the proper code has been received.

The ICs are thus organized in a serial ring in which a complete and verified control code transmission is required between each successive pair of ICs, and between the software verification unit and the two end ICs, to enable overall system operation. Each IC has a control code subcircuit which is provided with a unique control code as described previously; the control codes may be disguised by the use of apparent circuit elements as described. Thus, if the system is tampered with by removing any of the boards and replacing it with a substitute board having an IC with a different control code, the system will fail.

The control code for each IC is unique. Thus, in the case depicted in FIG. 13, with six PC boards and 1 software verification unit, there would be a total of seven (7) unique control codes. Therefore the seven units (6 boards and 1 software unit) will expect one unique code as being input to them and then, upon receipt of the correct control code, will transmit another unique control code the following unit in the chain. This means that each unit must contain, or have knowledge of, two different and unique control codes. This requirement would be implemented in the six FIB modified ICs by the fabrication of two control code subcircuits in addition to the chip ID subcircuit.

If each control code consists of 8 bits, the advantage of having 7 unique codes becomes apparent. Since there are seven unique 8-bit codes, the number of possible unique codes for the overall system is equal to $(2^8)^7 = 2^{56}$. Clearly this is an astronomical number.

Figure 14:
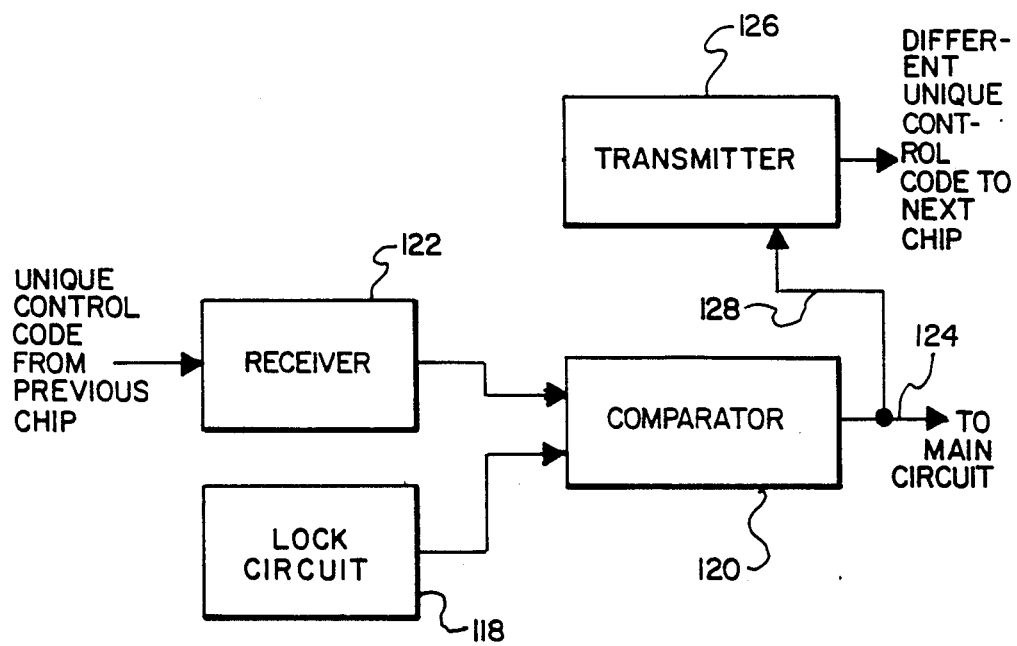
FIG. 14 is a block diagram of the control circuitry employed in the chips of FIG. 13.

A security system for each board is illustrated in FIG. 14. A lock circuit 118 on each IC, which may be implemented as the control code subcircuit shown in FIG. 11, for example, delivers its code to a comparator 120. The comparator also receives the control code received from the previous IC in the ring by receiver 122. The comparator provides an enable signal for the main IC circuitry over output line 124 only when the control signals from the lock circuit 118 and receiver 122 match. A transmitter 126 on the same board transmits the control code for the next IC in response to a successful comparison between the lock circuit and the received control code (indicated by line 128). The control code transmitted to the next IC is unique and different from the one received from the previous IC.

In fabricating the security mechanism, the receiver and transmitter will ideally be provided in the same IC as the lock circuit and comparator. However, a hybrid package consisting of multiple chips might also be used. The nominal IC could be placed on one chip, the lock circuit on another chip, the interruption circuit which responds to the lock circuit to enable or disable the nominal IC on a third chip, and the transmitter and receiver on their own chips.

The use of electromagnetic radiation in the infrared range as a transmission medium between chips appears to be promising. Other transmission candidates are ultrasonic waves transmitted through the mechanical structure of the PC board or through the air, and high frequency carrier signals transmitted over the power conductors of the PC board. While all PC boards included in the transmission ring have thus far been described as operational components of the overall system, it would also be possible to have one or more members of the ring serve only as repeaters by receiving and transmitting appropriate control codes. Pressing this to the limit, it would be possible for only one key operational IC to be interruptible, with all of the remaining members of the ring serving as repeaters.

A very powerful security technique has thus been described which provides for either copy or use control, or both, in a great number of different environments. Since numerous modifications and variations will occur to those skilled in the art, it is intended that the invention be limited only in terms of the appended claims.

We claim:

1. A secure electrical circuit system, comprising:
   at least one integrated circuit (IC) designed to perform a desired circuit function, the IC including circuit elements interconnected to perform said circuit function;
   at least one additional circuit element in the IC which does not contribute towards said circuit function, said additional element being connected with the remainder of the IC circuitry to inhibit the proper functioning thereof in case of an attempted unauthorized use or copying of the system, and means for disguising the identity of said additional circuit elements.

2. The system of claim 1, wherein said additional elements have the visible appearance of being functionally interconnected with the remainder of the IC circuitry, but include a physical modification not readily visibly apparent to a copyist causing them to function in a different manner.

3. The system of claim 2, wherein at least one of said additional elements comprises an apparent metallized circuit connection, said apparent connection comprising separate metallized sections spaced from each other by a very narrow, non-conductive gap, said gap forming an open circuit between the sections.

4. The system of claim 3, wherein said gap comprises a focused ion beam cut.

5. The system of claim 2, wherein at least one of said additional elements includes a doped semiconductor region, said modification comprising an ionized implant alteration of said region sufficient to change the function of the element from its visibly apparent function.

6. The system of claim 5, said modification comprising an increase in the doping level and subsequent thermal anneal of the doped region from the element's visibly apparent doping level sufficient to substantially increase the conductivity of the doped region.

7. The system of claim 5, said modification comprising a reduction in the doping level and subsequent thermal anneal of the doped region from the element's visibly apparent doping level sufficient to substantially reduce the conductivity of the doped region.

8. The system of claim 5, wherein said implant is unannealed and non-conductive.

9. The system of claim 5, said IC being formed on a semiconductor substrate, said modification comprising an ionized implant of the substrate material into the doped region sufficient to disorder its lattice structure.

10. The system of claim 1, including a plurality of individual ICs, the additional element for each IC comprising a control code subcircuit having an associated control code, said control code subcircuit inhibiting proper functioning of the remainder of the IC unless it has received its correct control code, wherein the control circuit codes for at least some of the ICs in the system are disguised by providing said ICs with control circuit codes which are different from each other.

11. The system of claim 10, wherein said control code subcircuit is connected to immediately inhibit proper functioning of the remainder of the IC unless it has received the correct control code.

12. The system of claim 10, wherein said control code subcircuit includes a timing circuit and is connected to inhibit proper functioning of the remainder of the IC a predetermined period of time after not receiving the correct control code.

13. The system of claim 10, wherein said control code subcircuit includes a counter which counts the number of times the system is used after receiving its correct control code, the control code subcircuit being connected to inhibit proper functioning of the remainder of the IC when the system has been used a predetermined plural number of times without receiving another correct control code.

14. The system of claim 10, said ICs comprising parts of an overall functional system, at least some of said ICs including means for transmitting a coded control signal to other ones of the ICs, the transmitted signals corresponding to the control circuit codes of said other ICs, and at least some of said ICs including means for receiving a coded control signal from a transmitting IC, means for comparing the received control sgnal with the control circuit code in its control subcircuit, and means for inhibiting proper functioning of the remainder of the IC if the compared signal and code do not match.

15. The system of claim 14, wherein each IC in the system includes both means for transmitting and means for receiving a coded control signal.

16. The system of claim 14, said transmitting and receiving means respectively comprising means for transmitting and for receiving electromagnetic infrared signals.

17. The system of claim 14, wherein said ICs are arranged for serial transmission and reception of said coded control signals.

18. The system of claim 14, wherein said IC is implemented on a chip, and the transmitting and receiving means for each IC is implemented on a separate chip.

19. The system of claim 10, the control code subcircuit of each IC being at least partially formed with a focused ion beam (FIB), laser beam, or electron beam; the beam being programmed to alter the control code from IC-to-IC.

20. The system of claim 10, wherein the IC control code subcircuits have at least one circuit element having the visible appearance of being functionally interconnected with the remainder of the control code subcircuit to produce an apparent control code, said circuit element including a physical modification not readily apparent to a copyist causing the control code subcircuit to have an control code which is different from its apparent control code.

21. The system of claim 20, wherein said circuit element includes an apparent metallized connection between different portions of the element, said apparent connection comprising separate metallized sections spaced from each other by a very narrow, non-conductive gap, said gap forming an open circuit between the sections.

22. The system of claim 20, wherein said circuit element includes a doped semiconductor region, said modification comprising an alteration of the doping of said region sufficient to alter the function of the element from its apparent function, and thereby after the IC's control code from its apparent code.

23. The system of claim 10, each of said ICs including an externally addressable chip identification subcircuit which uniquely identifies the IC, thereby enabling the identification of the IC and its corresponding control circuit code to be externally determined.

24. The system of claim 1, wherein said IC is implemented in a chip, and said additional circuit elements are in the same chip as the IC.

25. A method of securing an integrated circuit (IC) having a plurality of circuit elements from unauthorized copying, said circuit elements having visibly perceptible apparent structures, comprising:

physically modifying at least one of said circuit elements to change its electrical characteristics in a manner that is not readily visibly perceptible, said elements in their modified states enabling the proper functioning of the IC, but in their apparent states inhibiting the proper functioning of the IC.

26. The method of claim 25, wherein at least one of said modified circuit elements initially comprises a metallized circuit connection, and a very narrow gap is cut into the connection to divide it into sections, said gap being wide enough to electrically separate the sections from each other but not wide enough to be readily visibly perceptible.

27. The method of claim 26, wherein said gap is cut with a serial writing beam apparatus having a beam dimension at least as small as the smallest feature size of the altered circuit elements.

28. The method of claim 27, wherein said gap is cut with a focused ion beam.

29. The method of claim 27, wherein said gap is cut with a laser beam.

30. The method of claim 26, wherein said gap is covered by a metallization layer immediately above the cut region.

31. The method of claim 25, wherein at least one of said modified circuit elements includes a doped region prior to alteration, and said element is altered by implanting ions into said region to alter its electrical characteristics.

32. The method of claim 31, said IC being formed on a semiconductor substrate, wherein said element is modified by implanting ions of the substrate material into the doped region to disorder its lattice structure and render it at least highly resistive.

33. The method of claim 31, wherein said element is modified by implanting ions into the doped region to decrease its conductivity.

34. The method of claim 31, wherein said element is modified by implanting ions into said region to increase its conductivity.

35. The method of claim 31, wherein a focused ion beam is used to implant ions into said region.

36. The method of claim 31, wherein an electron beam is used to inject electrons into said region.

37. The method of claim 31, further comprising the step of covering the doped region with a metallization layer after it has been altered.

38. A method of securing a functionally related series of integrated circuits (ICs) from unauthorized use, comprising:
fabricating the ICs to perform respective intended functions,
fabricating respective control code subcircuits on each IC to store respective control codes,
providing each IC with a means for receiving an externally applied control signal,
fabricating a circuit lock on each IC which inhibits the IC from performing its intended function unless it has received an externally applied control signal which matches the control code stored in the control code subcircuit, and
modifying the control code subcircuits from IC-to-IC so that the various ICs cannot be unlocked with the same control signal.

39. The method of claim 38, wherein said control code subcircuits are at least partially formed with a focused ion beam (FIB), laser beam or electron beam, and said beam is programmed to modify the control code for each successive IC.

40. The method of claim 39, wherein the beam is programmed to modify the control code for each successive IC in a manner that is not readily visibly perceptible.

41. The method of claim 40, wherein said control code subcircuits initially include metallized circuit connections, and a FIB or laser beam is programmed to cut a very narrow gap into at least some of said connections to divide them into sections, said gap being wide enough to electrically separate the sections from each other but not wide enough to be readily visibly perceptible.

42. The method of claim 40, wherein said control code subcircuits include circuit elements with respective doped regions, and a FIB is used to implant ions into at least some of said regions to alter the electrical characteristics of their respective circuit elements.

43. The method of claim 40, wherein the circuit lock for each IC is adapted to immediately inhibit its IC from performing its intended function unless the IC is addressed with a matching control signal.

44. The method of claim 40, wherein the circuit lock for each IC is adapted to inhibit its IC from performing its intended function a predetermined delay period after the IC has not been addressed with a matching control signal.

45. The method of claim 40, wherein the circuit lock for each IC is adapted to inhibit its IC from performing its intended function when the IC has been used a predetermined plural number of times after not receiving a matching control signal.

46. The method of claim 38, further comprising the steps of fabricating respective chip identification subcircuits on each IC from which the chip identification of the IC can be externally read, and modifying the identification subcircuits from IC-to-IC so that each IC is uniquely identified by its respective identification subcircuit.

47. The method of claim 46, wherein said control code subcircuits are at least partially formed with a focused ion beam (FIB), laser beam, or electron beam; and said beam is programmed to modify the identification subcircuit for each successive IC.

48. The method of claim 47, wherein the beam is programmed to modify the identification subcircuit for each successive IC in a manner that is not readily visibly perceptible.

49. A secure electrical circuit system, comprising:
a plurality of integrated circuits (ICs) designed to perform respective functions, each IC including a control code subcircuit storing a control code and adapted to receive a control signal, and a circuit lock which inhibits the IC from performing its intended function in the absence of its control code subcircuit receiving an externally applied control signal which matches its control code, said ICs being connected together in the system such that the inhibition of at least one of the ICs from performing its intended function prevents the system from operating properly,
each of said ICs including means for transmitting and means for receiving respective coded control signals, and
said ICs being organized for serial transmission in an open ring, with the first IC in the ring adapted to receive an externally applied control signal and to transmit a coded control signal which matches the control code of the second IC in the ring, each subsequent IC in the ring except for the last IC having an control code which matches the control signal transmitted by the previous IC in the ring and transmitting a control signal which matches the control code of the next IC in the ring, the last IC having an control code which matches the control signal transmitted by the next-to-last IC in the ring and transmitting a control signal for external verification, whereby the system is prevented from operating properly if any of the ICs is replaced with an IC not having the two required control codes.

50. The system of claim 49, wherein the control code for each IC is different from the control codes for the other ICs.

51. The system of claim 49, further comprising an external verification unit which includes means for transmitting the control code for the first IC in the ring to that IC, for receiving a control signal from the last IC in the ring, verifying the signal from the last IC, and inhibiting proper operation of the system in the absence of the proper signal from the last IC.

52. The system of claim 51, wherein the external verification unit is implemented in at least one of software, firmware or hardware.

53. The system of claim 49, wherein the circuit lock for each IC is adapted to immediately inhibit the IC from performing its intended function unless the IC receives a control signal which matches its control code.

54. The system of claim 49, wherein the circuit lock for each IC is adapted to inhibit the IC from performing its intended function a predetermined period of time after the IC has not received a matching control signal.

55. The system of claim 49, wherein the circuit lock for each IC is adapted to inhibit the IC from performing its intended function when the IC has been used a predetermined plural number of times after not receiving a matching control signal.

56. The system of claim 49, wherein said control code subcircuits for at least some of the ICs include at least one apparent metallized circuit connection, said apparent connection comprising separate metallized sections spaced from each other by a very narrow, non-conductive gap which is wide enough to electrically separate the sections from each other but not wide enough to be readily visibly apparent.

57. The system of claim 49, wherein said control code subcircuits for at least some of the ICs include at least one circuit element with a doped region, said region including an ionized implant which is not visibly perceptible but modifies the function of said element from its visibly apparent function.

58. The system of claim 49, further comprising at least one IC repeater station interspersed between successive ICs in the ring, each repeater station including a control code subcircuit with an control code matching the control signal transmitted from the previous IC, means for receiving the control signal from the previous IC and applying it to the control code subcircuit, means for transmitting a coded control signal which matches the control code subcircuit of the next IC, and means for interrupting the serial ring transmission in the event the control signal which the repeater station receives does not match its control code.

59. The system of claim 49, wherein the ICs are implemented on respective circuit chips, and the control signal receiving and transmitting means for each IC is located off the chip for that IC.

60. The system of claim 49, wherein the ICs are implemented on respective circuit chips, and the control signal receiving and transmitting means for at least some of the ICs are located on the same chips as their respective ICs.

61. The system of claim 49, wherein one element of the ring comprises operating system software.

62. The system of claim 61, wherein the ring consists of at least one IC and the operating system software.

63. The system of claim 61, wherein said software contains the unique control codes required by the ICs and the algorithms to interact with the system hardware to transmit, receive, and authenticate such control codes.

64. The system of claim 63, said software comprising individual copies of the operating system software which contain only the control codes associated with a single predetermined copy of the system hardware.

65. The system of claim 49, wherein the ring consists of at least one IC and a control algorithm implemented in firmware.

* * * * *

UNITED STATES PATENT AND TRADEMARK OFFICE
CERTIFICATE OF CORRECTION

PATENT NO. : 4,766,516

DATED : August 23, 1988

INVENTOR(S) : Faik S. Ozdemir et al

It is certified that error appears in the above—identified patent and that said Letters Patent is hereby corrected as shown below:

Column 1, after the title, and before "BACKGROUND OF THE INVENTION" insert: --The United States Government has rights in this Application pursuant to Contract No. 86-N218000-000--.

Signed and Sealed this

Twenty-ninth Day of November, 1988

*Attest:*

DONALD J. QUIGG

*Attesting Officer*    *Commissioner of Patents and Trademarks*